UNITED STATES PATENT OFFICE.

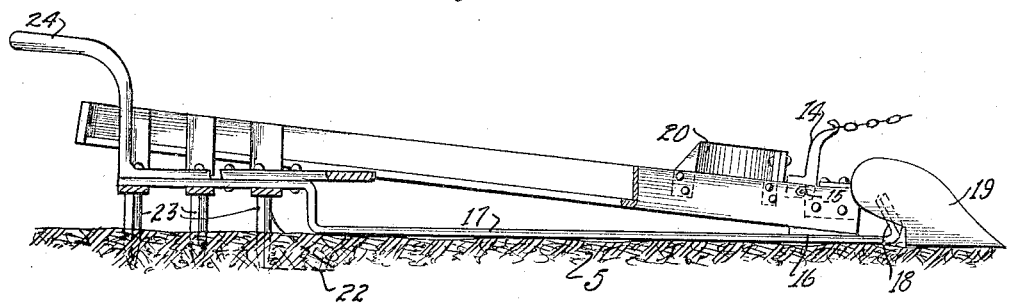
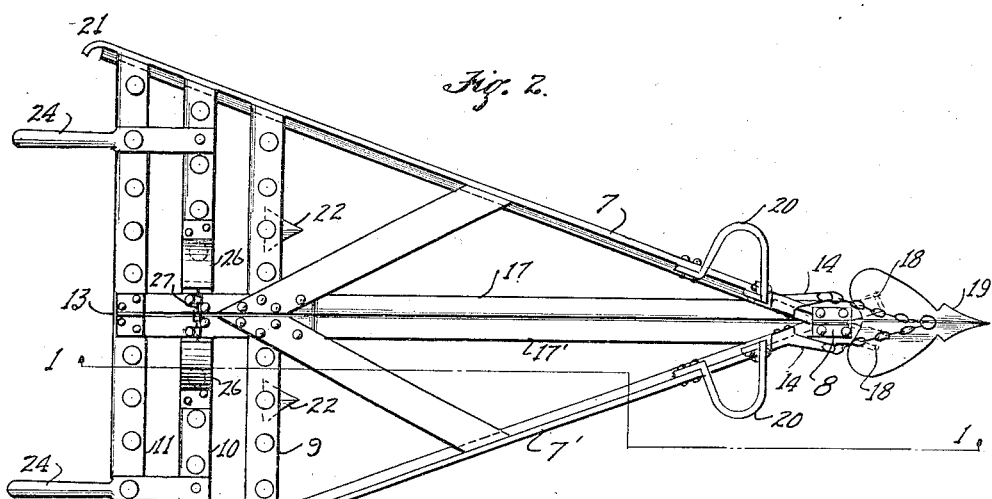
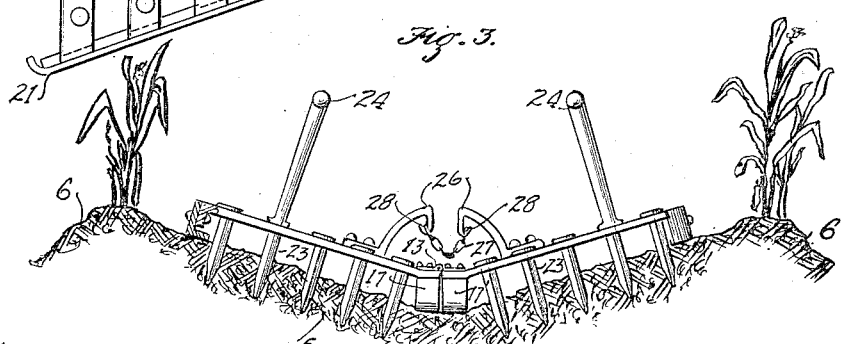

CHARLES STRASSER, OF LOS ANGELES, CALIFORNIA.

CULTIVATOR.

1,124,183.  Specification of Letters Patent.  Patented Jan. 5, 1915.

Application filed March 9, 1914. Serial No. 823,348.

*To all whom it may concern:*

Be it known that I, CHARLES STRASSER, a citizen of the United States, residing at Los Angeles, in the county of Los Angeles, State of California, have invented new and useful Improvements in Cultivators, of which the following is a specification.

It is the object of this invention to provide a cultivator adapted to cultivate ground where the latter has been previously formed into hills without destroying the hills, or changing the inclination of the sides of the furrows by automatically adjusting itself to sloping sides of various inclinations.

It is also an object to provide a cultivator with a plurality of sub-soilers which precede the cultivator teeth and break up portions of the soil which may not have previously been turned over.

It is a further object to provide a cultivator with a plurality of shoes, one acting as a runner to hold it straight, and others adapted to support the cultivator when it is being transferred from one place to another without disturbing the soil.

The invention is illustrated in the accompanying drawing, in which:

Figure 1 is a side elevation of the cultivator. Fig. 2 is a plan view thereof. Fig. 3 is a rear view showing the inclined arrangement of the teeth of the cultivator to accommodate the mounds, and illustrating the manner in which the cultivator will follow the previously formed inclination of the surface between the mounds.

More specifically in the drawings, 5 designates the ground which has been previously cultivated and formed into mounds 6 for the cultivation of certain classes of agricultural products, corn being usually grown on soil thus mounded.

The cultivator consists mainly of a V-shaped frame, having side members 7 and 7' hingedly connected together at their point of intersection by means of a hinge 8. The side frames are preferably formed of angle iron and bent to the configuration shown, transversely of which members are secured a plurality of cross bars designated 9, 10, 11, and diagonal brace bars 12, those numbered 9, 10, and 11 being hinged at 13 at their centers in alinement with the hinge 8 so that they may be bent to the angular formation shown, corresponding with the angle of the ground line intermediate the rows of the growing crop, and which angle can be varied by manually adjusting the side frames 7 and 7' in relation to each other. The forward end of each side frame 7 and 7' is provided with a clevis-hook which is formed on the end of an angular standard 14, which is secured to the frame members by means of the bolts 15. A bracket 16 on the forward ends of the frame members extends beneath the lower edge of the frame members and forms a forward support for a pair of longitudinal shoes or runners 17—17', which are preferably formed of flat metal strips bent at their forward ends ahead of the frames 7 and 7' to form supports 18 for the double divided shovel 19 or plow shoe.

The rearwardly extending portions of the runners 17 and 17' are carried in a plane corresponding to the ground level, and the frame members 7 and 7' are inclined in relation thereto, and are bent upward ahead of the brace 9. The rear portions of the runners are extended parallel with their lower portion and secured to the most dependent portion of each of the braces 9, 10 and 11 on opposite sides of the hinges 13 by suitable rivets or other fastenings.

Mounted slightly to the rear of the draw bar 14 on each of the frame members 7 and 7' are shoes 20 bent to the configuration shown, so that their outer faces project beyond the sides of the frame members 7 and 7' in such manner that when the frame is tipped upon its side to be transported from one point to another, it will ride upon one of the shoes and upon a shoe 21 formed on the rear ends of the frame members 7 and 7'.

The bar 9 is provided with a plurality of plow shoes or sub-soilers 22, one of which is placed on each side of the center line of the instrument, these sub-soilers having the usual threaded extensions which are disposed through bores in the base 9 and either bolted or riveted thereto. The cross-bars 10 and 11 support plain harrow teeth 23 of the usual square cross section pointed in the ordinary manner and secured by any well known means in vertical position to the cross bars; teeth 23 being also mounted on the bar 9 on opposite sides of the sub-soilers 22.

To facilitate lifting and turning the cultivator suitable handles 24 are provided, which are shown bridging the two cross-bars 10 and 11 and secured thereto by means of rivets 25; these handles extending upwardly and rearwardly convenient to the reach of the operator.

As a means for preventing the leaf members of the cultivator from folding together when turning corners and when transporting it from one place to another on the side runners 20 and 21, upwardly and inwardly curved bars 26 are mounted on the cross bar 10 with their adjacent ends spaced such distance apart as to permit of sufficient movement of the side portions of the cultivator in relation to each other to form the desired furrow, and which members on abutting against each other will act to prevent the side portions of the frame from folding together.

A short chain 27 loosely connects the ends of the members 26 and serves to prevent the side members of the frame from doubling in the opposite direction. This chain 27 is connected to hooks 28 in the ends of the members 26 and can be adjusted thereon so as to limit the extent of horizontal straightening of the side members of the frame in relation to each other, as desired.

The operation of the cultivator will be readily understood; the double shovel 19 breaking up small portions of uncultivated soil which may have been left in the center of the rows, the drag frame formed by the frame members 7 and 7' smooths the soil and builds up the mounds, the runner 17 guiding the cultivator in the furrow, the plow shares 22 cultivate where a strip of uncultivated soil may have been left, and the teeth 23 pulverizing the soil to the proper degree, so that a most efficient and convenient combination cultivator is provided.

By raising or depressing either of the handles 24 the leaf portions of the cultivator on opposite sides of the hinges 8 and 13 may be moved into any desired inclination in relation to the opposite leaf portion.

What I claim is:

1. A combination cultivator, comprising an angularly formed frame, the sides thereof extending upwardly and outwardly, a plurality of cross bars supported thereon, a longitudinal runner extending from end to end thereof, and a plurality of cultivating devices of different types supported on said runners and said cross bars.

2. A combination cultivator, comprising an angularly formed frame, the sides extending upwardly and outwardly from their junction, a plurality of cross bars transversely supported thereon, certain of said cross bars being formed with dependent teeth supporting sections, harrow teeth supported thereon at an angle to said sections and parallel with each other in a vertical position, and a plurality of runners secured to said frame adapted to support said cultivator in operative and inoperative positions.

3. A combination cultivator, comprising angularly disposed frame members hinged at their point of intersection, a series of cross bars connecting the outer ends of the side frames hinged at their centers, a runner connected at its forward end to the side frames, and at its rearward end to the cross bars, a shovel mounted at the apex of the side frames, and cultivating devices depending from said cross bars.

4. A cultivator, comprising an angular frame hinged at its center to form leaf members adapted to be rocked independent of each other, a shovel at the apex of the frame, and depending cultivating devices carried on the rear portion of the frame.

5. A cultivator, comprising an angular frame hinged at its center to form leaf members adapted to be rocked independent of each other, a shovel at the apex of the frame, depending cultivating devices carried on the rear portion of the frame, and a runner extending centrally of the frame and disposed in angular relation thereto.

6. A cultivator, comprising an angular frame hinged at its center to form leaf members adapted to be rocked independent of each other, a shovel at the apex of the frame, depending cultivating devices carried on the rear portion of the frame, a runner extending centrally of the frame and disposed in angular relation thereto, and means for limiting the movement of the leaf members of the frame in either direction in relation to each other.

In witness that I claim the foregoing I have hereunto subscribed my name this 24th day of February, 1914.

CHARLES STRASSER.

Witnesses:
 MARGUERITE BATES,
 MARIE BATTEY.

Copies of this patent may be obtained for five cents each, by addressing the "Commissioner of Patents, Washington, D. C."